US006169480B1

(12) United States Patent
Uhl et al.

(10) Patent No.: US 6,169,480 B1
(45) Date of Patent: Jan. 2, 2001

(54) DEVICE FOR MEASURING VEHICLE TIRE PRESSURE

(75) Inventors: Günter Uhl, Helmstadt-Bargen; Norbert Normann, Niefern-Öschelbronn; Gunter Lothar Schulze, Ispringen; Ralf Kessler, Pfinztal, all of (DE)

(73) Assignee: Doduco GmbH (DE)

( * ) Notice: Under 35 U.S.C. 154(b), the term of this patent shall be extended for 0 days.

(21) Appl. No.: 08/973,280

(22) PCT Filed: May 26, 1996

(86) PCT No.: PCT/US96/02263

§ 371 Date: Apr. 20, 1998

§ 102(e) Date: Apr. 20, 1998

(87) PCT Pub. No.: WO96/37373

PCT Pub. Date: Nov. 28, 1996

(30) Foreign Application Priority Data

May 26, 1995 (DE) .............................. 195 18 805

(51) Int. Cl.[7] .................................. B60C 23/00
(52) U.S. Cl. .......................... 340/442; 340/438; 340/445; 73/146.2
(58) Field of Search .................... 340/438, 442, 340/445; 73/146.2, 146.4, 146.5, 146.8

(56) References Cited

U.S. PATENT DOCUMENTS 5,808,190 * 9/1998 Ernst .................................. 73/146.5
5,924,055 * 7/1999 Hattori .............................. 702/138

* cited by examiner

Primary Examiner—Daryl Pope
(74) Attorney, Agent, or Firm—Orum & Roth

(57) ABSTRACT

A tire pressure monitoring device includes a pressure measurement sensor provided on each of the wheels to be monitored, a transmitter arranged near each pressure measurement sensor for sending signals representative of the pressure determined by the pressure measurement sensor, respective antennas for receiving the signals, the antennas being arranged on the vehicle chassis near the respective wheel. Each antenna is formed by making use of a separate electric line belonging to another monitoring system that is associated to the same wheel or is formed by making use of a sensor belonging to another monitoring system associated to the same wheels. Alternatively an electric line that leads to another consumer which is associated to the respective wheel, like a lamp, is used as an antenna.

11 Claims, 3 Drawing Sheets

DEVICE FOR MEASURING VEHICLE TIRE PRESSURE

BACKGROUND OF THE INVENTION

1. Field of the Invention

The present invention relates to a device for monitoring the air pressure on the tires of a vehicle.

2. Discussion of the Prior Art

A device of this kind has been known from DE 41 33 993 C2. The known device comprises a pressure measurement sensor and a transmitter that are integrated in the valve cap of the associated wheel. The receiver preferably consists of a portable remote control which is taken to the respective wheel to activate the electronic circuit contained in the valve cap in order to carry out a remote inquiry for the tire pressure measured. In this case, the tire pressure can be monitored only at intervals, with the vehicle in a stationary condition; performing an inquiry while driving is not possible. However, DE 41 33 993 C2 already discloses the possibility, instead of arranging the transmitter and receiver devices in a portable remote control unit, to arrange them on the chassis of the vehicle, near the wheel, and to provide indication means on the instrument panel. In any case, signals representative of the air pressure determined by the pressure measurement sensor are sent by wireless means to an evaluation and indicating device by the transmitter arranged at the wheel.

A similar device has been known also from DE 41 33 999; however, in this case the pressure measurement sensor and the transmitter are not arranged in the valve cap, but rather on the valve base.

Mounting a transmitter and receiver device in the neighborhood of each wheel, for inquiring the air pressure prevailing in the tire, is rather costly.

SUMMARY OF THE INVENTION

Now, it is the object of the present invention to teach how the structure and installation of a device for monitoring the tire pressure of vehicles can be simplified and made less costly.

An antenna associated to each wheel is connected to an electronic receiver and evaluation circuit. According to the invention, no separate electric line has to be run for the antenna; rather, the antenna makes use of an electric wire belonging to another monitoring device allocated to the same wheel, specifically a device monitoring the brake lining wear on the respective wheel or an antilock system or a control device that serves to avoid wheel slip on the driven wheels. This has the effect to reduce the amount of circuitry, the susceptibility to failure, and reduces the installation and wiring expense because one electric line, which is anyway guided to the neighborhood of each wheel to be monitored, can be used for several purposes at the same time. This last-mentioned aspect is of particular importance because as the number of functions of the vehicle, that are monitored, controlled and activated by electric means, has risen considerably over the last few years, the amount of wiring increased in parallel so significantly that it is already now very difficult to accommodate the cabling harnesses, that get continuously thicker and thicker, in the cavities of the vehicle body. If one electric line is used for several purposes, as provided by the present invention, the amount of wiring is not increased by the transmission of the signal from the transmitter to the receiver and the evaluation circuit although a separate antenna is allocated to each wheel.

The line must of course be suited as antenna for the intended frequency range. The possible frequencies for the transmission of signals lie in the range of a few hundred mega-hertz, specifically 433 MHz. As the frequencies used for antilock systems and slip control systems normally do not exceed a few kilo-hertz, and as brake lining wear indicators also use low frequencies or direct current, the high-frequency signals of the tire pressure monitoring system and the low-frequency signals of the remaining monitoring systems can be transmitted, and later separated, via a common wire without any difficulty.

Preferably, the electric line consists of a coaxial cable, from which the outer conductor is removed in the neighborhood of the associated wheel over part of its length, specifically over a length corresponding to a quarter-wave length of the tire pressure signal to be transmitted—i.e. 17 cm (6.6 inches) for a frequency of 433 MHz.

Another possibility consists in modifying the sensors, that are used for the antilock system, the slip control system or for the brake lining wear indicator, in such a way as to render them serviceable as antenna for the tire pressure monitoring device. This also has the result that the feed lines leading to the other monitoring devices are used twice, being used simultaneously by the tire pressure monitoring system.

Particular advantages can be achieved in each of the before-described cases if instead of providing a separate receiver circuit for each wheel, a common receiver and evaluation circuit is provided at a central position in the chassis. This helps once more reduce the amount of circuitry, the susceptibility to failure and the cost.

However, there is also the possibility to use as antenna cables of any other lines, that do not lead to a monitoring device, provided they run sufficiently close to the respective wheel, for example, wires supplying a lamp or any other electric consumer.

DETAILED DESCRIPTION OF THE DRAWINGS

Some exemplifying embodiments of the invention will be described hereafter with reference to the attached drawings, in which.

DETAILED DESCRIPTION OF THE PREFERRED EMBODIMENT

Figure 1:
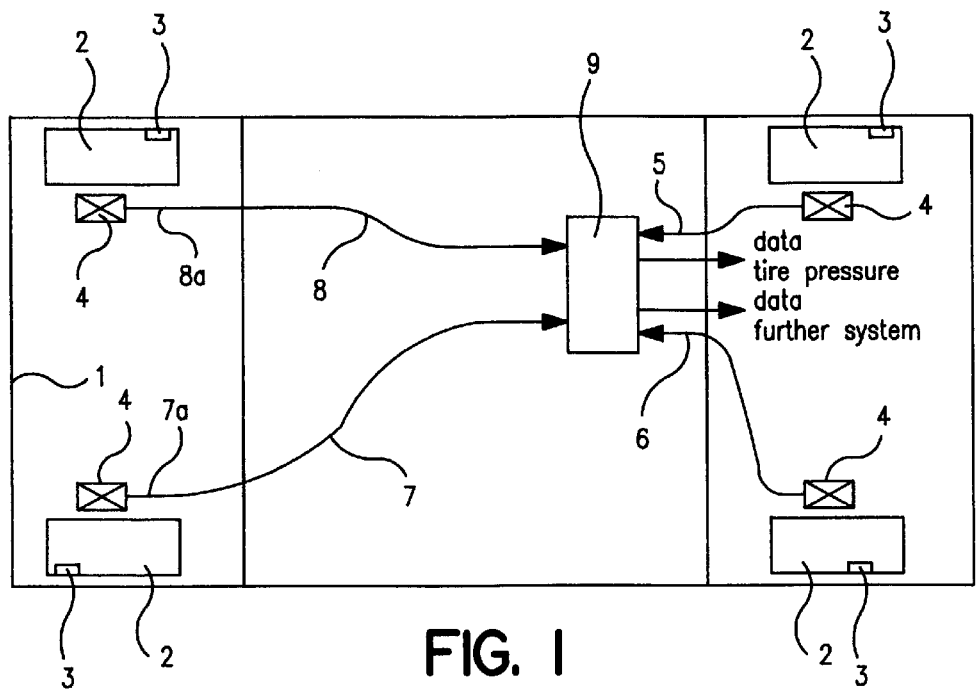
FIG. 1 shows a diagrammatic representation of the arrangement of a device for monitoring the tire pressure in a vehicle.

In the diagrammatic layout of FIG. 1, there can be seen the chassis 1 of a vehicle having four wheels 2, each equipped with an arrangement 3 comprising a pressure measurement sensor and a transmitter. A sensor 4 is allocated to each wheel 2. Each sensor 4 is located near the respective wheel 2. The sensor 4 may be a sensor that monitors the tire spin as part of an antilock system or a slip control system, or a sensor that monitors the wear of the brake lining of a disk brake associated to the wheel 2.

Figure 2:
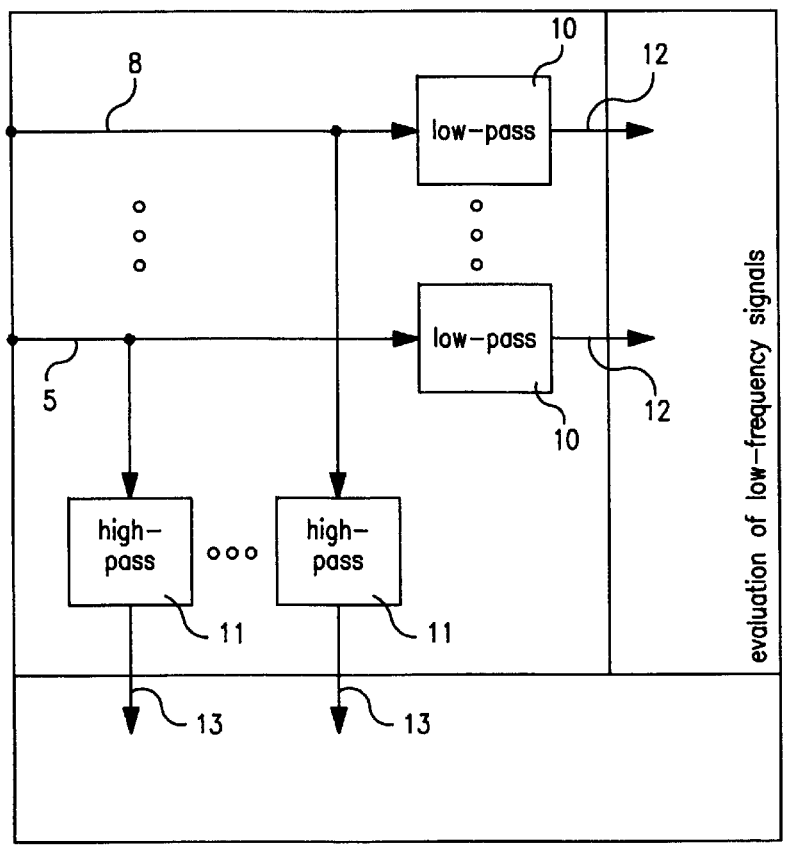
FIG. 2 shows a block diagram of a circuit element serving to separate high-frequency and low-frequency signal components.

Electric lines 5, 6, 7 and 8 lead from the sensors 4 to a separating circuit 9 illustrated in FIG. 2.

The lines 5 to 8, specifically coaxial cables, are suited for the transmission of high-frequency signals. They transmit not only the signals from the antilock system, slip control system or brake lining wear monitoring system, produced by the sensors 4, but also the signals transmitted in wireless fashion from the arrangements 3. To this end, either the sensors 4 are modified in such a way that they simultaneously serve as high frequency antennas, or the lines 5 to 8 are given a design that makes them suitable as such antennas. The latter solution is illustrated by way of example by the lines 7 and 8, which are freed for this purpose at their ends, by which they are connected to the respective sensor 4, in the neighborhood of the wheel 2 over part of their length 7a, 8a, preferably over a length corresponding to one quarter-wave length of the transmitter frequency of the arrangement 3, of their metallic outer conductor, that otherwise serves to screen the inner conductor of the coaxial cable. The signals transmitted by the arrangement 3, that can be received in this way, are separated form the low-frequency signals of the sensors 4 in the separating circuit 9 by low-pass filters 10 and high-pass filters 11. The low-frequency signals are then supplied, via lines 12, to a known evaluation circuit being not the object of the present invention.

The high-frequency signals are supplied to a suitable receiver and evaluation circuit via separate lines 13, 14. Circuits suited for this purpose are illustrated in FIGS. 3 to 5.

Figure 3:
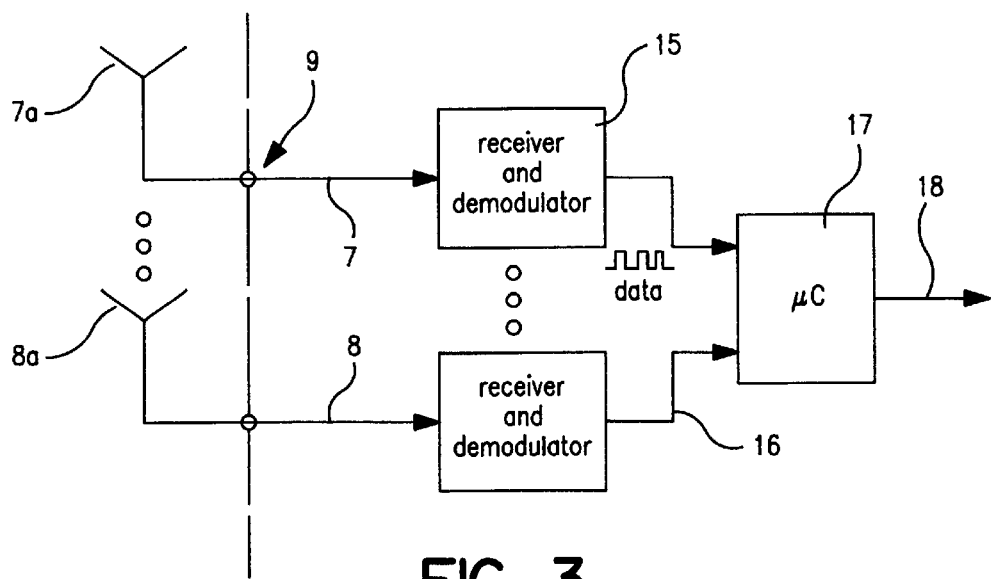
FIG. 3 shows a block diagram of one embodiment of a receiver and evaluation circuit comprising several receivers.

In the circuit arrangement illustrated in FIG. 3 the signals transmitted by the transmitter on the wheel 2 and carrying information representative of the air pressure in the tire, are picked up by antennas 7a, 8a, which may take the form of sections of the coaxial cables 7 and 8 freed of the outer conductor, and are transmitted via the coaxial cables 7 and 8 and via the separating circuit 9—shown only as interface in FIG. 3—to receivers 15 and 16 comprising a demodulator. At a central position in the chassis, a separate receiver 15, 16 with a demodulator is associated to each receiving antenna (each wheel) so that the demodulated data received from each wheel 2 are available, and can be evaluated in parallel. This is effected by a microcomputer 17 to which the demodulated signals are supplied. The signals supplied at the output 18 of the microprocessor 17 are used to control an indicating device, such as an LCD display or a warning lamp.

Figure 4:
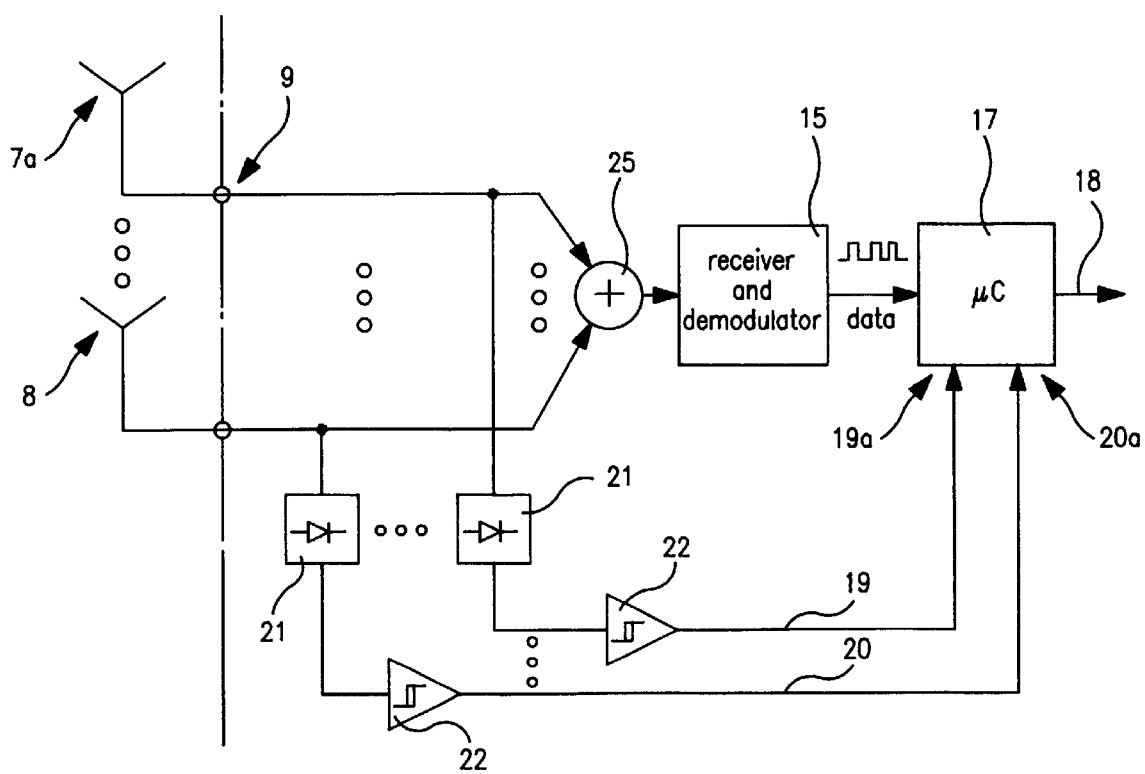
FIG. 4 shows a block diagram of one embodiment of a receiver and evaluation circuit comprising a single receiver.
Figure 5:
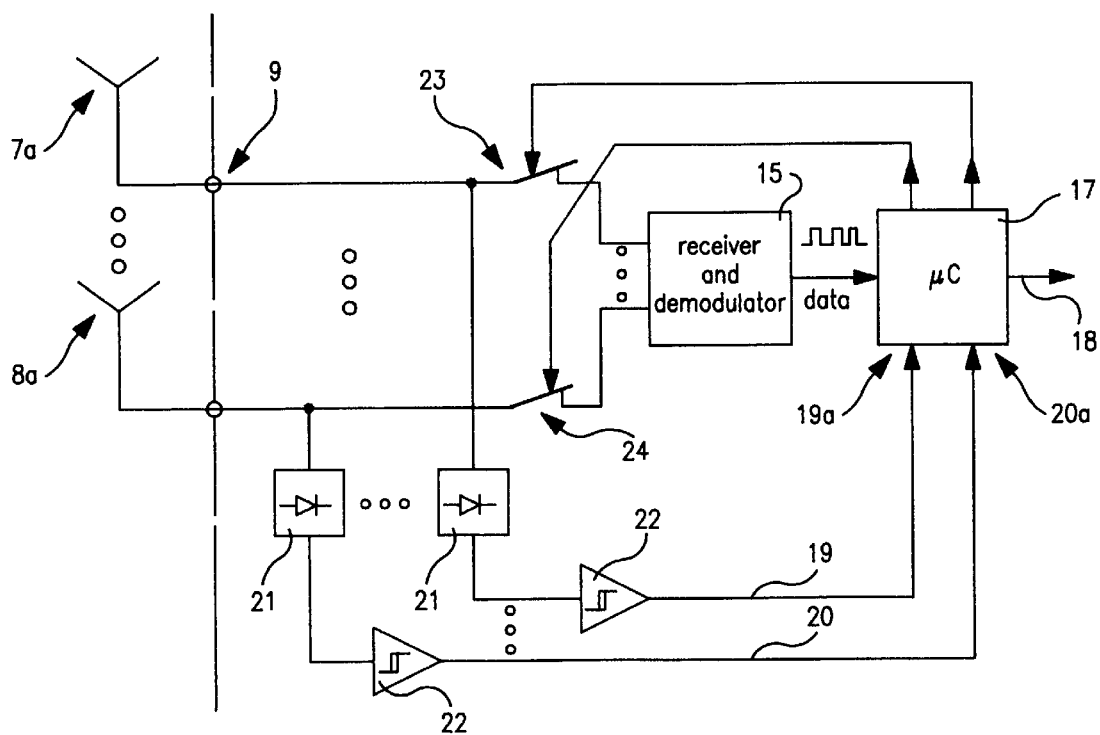
FIG. 5 shows a block diagram of a further embodiment of a receiver and evaluation circuit with a single receiver.

The circuit arrangement illustrated in FIG. 4 is distinguished from the circuit arrangement shown in FIG. 3 by a smaller amount of circuitry, as instead of comprising a separate receiver stage for each wheel 2, it uses a common receiver 15 and demodulator for all wheels being monitored. The signals received by all antennas 7a, 8a are combined in a summing stage 25 and supplied to the single receiver 15 and demodulator which derives from the data telegram arriving from the wheels a binary signal which is then transmitted to the microprocessor 17 serving as an evaluation circuit.

As has been disclosed by the prior art, the arrangements 3, composed of a pressure measurement sensor and a transmitter, do not operate permanently; in order to spare the batteries driving them, they are activated only at intervals to send a data telegram to the receiver 15. However, as the transmitters provided on the wheels 2 are not synchronized one with the other, it may happen that the data telegrams from different wheels come to overlap each other. In order to still obtain clear tire pressure monitoring results, an additional field strength evaluation step is provided for each signal supplied to the receiver 15. To this end, a branch line 19, 20 runs from each supply line 7, 8 directly to the microprocessor 17, bypassing the receiver 15. Each of these branch lines 19, 20 includes a rectifier 21 and a threshold value switch 22 connected in series. The rectifier 21 rectifies the separated signal component. If the field strength of the signal is sufficient, the rectified component is allowed to pass the threshold value switch 22 and is supplied to an input 19a or 20a of the microprocessor which thereupon is set to HIGH. This makes it possible for the microprocessor 17 to associate the signal supplied to it from the receiver 15 to a particular wheel 2. If data from more than one wheel are received simultaneously or in overlapping fashion, then a corresponding number of inputs 19a, 20a of the microcomputer are set to HIGH. The data supplied to the microprocessor 17 from the receiver 15 are not evaluated in this case.

The embodiment illustrated in FIG. 5 differs from that shown in FIG. 3 insofar as the receiver 15 of each wheel is preceded by a switch 23, 24 that can be controlled by the microprocessor 17. The switches 23, 24 replace the summing stage 25 illustrated in FIG. 4. The signals arriving from the antennas 7a, 8a are switched through to the receiver 15 with demodulator via switches 23, 24. The field strength evaluation is effected in the same way as in the embodiment shown in FIG. 4. Only after a signal, that has been separated from one of the lines 7, 8 and has been rectified, has set one of the inputs 19a, 20a of the microprocessor to HIGH will the switch 23, 24 in the associated line 7, 8 close, and the signal arriving from the antenna 7a, 8a will be switched through to the receiver 15. Another signal, arriving from another antenna and overlapping the first signal in time, will not be switched through to the receiver 15 by the microprocessor 17 and will, therefore, not interfere with the evaluation of the signal that arrived first. In the case of overlapping data telegrams sent by the wheels, the first telegram being received will be evaluated. However, it is of course also possible to work with a priority list, which means, for example, that if in the case of overlapping data telegrams received the one arriving in the second place comes from a wheel of higher priority, the evaluation of the first data telegram will be broken off and the second data telegram will be evaluated. Another possibility would be to cause the microprocessor 17 to cyclically interrogate the antennas 7a, 8a associated to the wheels, in which case no field strength evaluation will be necessary.

What is claimed is:

1. A device fitted to vehicles equipped with a chassis and wheels having pneumatic tires, said device for monitoring the air pressure within said tires, comprising:

a respective pressure measurement sensor provided on each of the wheels to be monitored;

a respective transmitter arranged near each pressure measurement sensor for sending signals representative of the air pressure determined by the pressure measurement sensor;

a receiver for receiving the pressure signals, said receiver arranged on the chassis of the vehicle neighboring the respective wheel;

an antenna arranged near each wheel, said antenna comprised of an electric line belonging to another monitoring system associated to each of the wheels.

2. the device of claim 1, wherein:

a pressure measurement sensor provided on each of the wheels to be monitored, a transmitter arranged near each pressure measurement sensor for sending signals representative of the tire pressure determined by the pressure measurement sensor, a receiver for the signals arranged on the chassis of the vehicle neighboring the respective wheel, wherein each receiver uses a sensor belonging to another monitoring system associated to each of the wheels for its respective antenna.

3. The device according to claim 1, wherein the other monitoring device respectively monitors the wear of a brake pad lining of each said wheels.

4. The device according to claim 1, wherein the other monitoring device respectively monitors the wheels for at least one of locked wheel conditions and wheel slip.

5. The device according to claim 1, wherein an electric line near the respective wheel, leads to another electrical consumer, and wherein said electric line is used as an antenna.

6. The device according to claim 1, wherein the electric line is a coaxial cable having a length, said cable free of its outer conductor over part of the length near the the respective wheel.

7. The device according to claim 1, wherein the electric line is a coaxial cable having a length, said cable free of its outer conductor over part of the length near the respective wheel.

8. Device according to claim 1, characterized in that the electric line (5, 6; 7, 8) is a coaxial cable, which is freed of its outer conductor over part or its length, in the neighborhood of the wheel (2).

9. The device according to claim 5, wherein the electric line is a coaxial cable having a length, said cable free of its outer conductor over part of the length near the respective wheel.

10. The device according to claim 2, wherein each of the antennas are connected to a common electronic receiver and a common signal evaluation circuit.

11. The device according to claim 5, wherein each of the antennas are connected to a common electronic receiver and a common signal evaluation circuit.

* * * * *